(12) United States Patent
Sasaki

(10) Patent No.: US 6,477,005 B1
(45) Date of Patent: Nov. 5, 2002

(54) THIN-FILM MAGNETIC HEAD HAVING A MAGNETIC LAYER INCLUDING AN AUXILIARY LAYER MADE OF A HIGH SATURATION FLUX DENSITY MATERIAL AND METHOD OF MANUFACTURING SAME

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/531,332

(22) Filed: Mar. 20, 2000

(30) Foreign Application Priority Data

Apr. 6, 1999 (JP) ............................................ 11-098404

(51) Int. Cl.[7] ........................... G11B 5/147; G11B 5/127
(52) U.S. Cl. ........................................ 360/126; 360/317
(58) Field of Search .................................... 360/126, 317

(56) References Cited

U.S. PATENT DOCUMENTS

| | | | | |
|---|---|---|---|---|
| 5,047,866 A | * | 9/1991 | Toyoda et al. | 360/126 |
| 5,373,408 A | * | 12/1994 | Bischoff et al. | 360/126 |
| 5,438,747 A | | 8/1995 | Krounbi et al. | 204/192.34 |
| 5,473,491 A | * | 12/1995 | Fujisawa et al. | 360/126 |
| 5,606,478 A | * | 2/1997 | Chen et al. | 360/126 |
| 5,966,800 A | * | 10/1999 | Huai et al. | 29/603.13 |

FOREIGN PATENT DOCUMENTS

| | | |
|---|---|---|
| JP | A-60-10409 | 1/1985 |
| JP | A-62-245509 | 10/1987 |
| JP | A-7-262519 | 10/1995 |

\* cited by examiner

Primary Examiner—David Davis
(74) Attorney, Agent, or Firm—Oliff & Berridge, PLC

(57) ABSTRACT

The present invention achieves reductions in a track width of a recording head and in a yoke length. A thin-film magnetic head of the invention comprises a reproducing head and a recording head. The recording head has a bottom pole layer and a top pole layer that include pole portions opposed to each other, a recording gap layer being placed between the pole portions. The recording head further has a thin-film coil located between the top and bottom pole layers, the coil being insulated from the pole layers. The bottom pole layer includes: a first portion located in a region including a region that faces a first layer of the thin-film coil; and second portion forming a pole portion and connected to a surface of the first portion facing the first layer of the coil. The bottom pole layer further has an auxiliary layer made of a high saturation flux density material and placed between the first portion of the bottom pole layer and the first layer of the coil. The auxiliary layer forms part of a magnetic path.

22 Claims, 14 Drawing Sheets

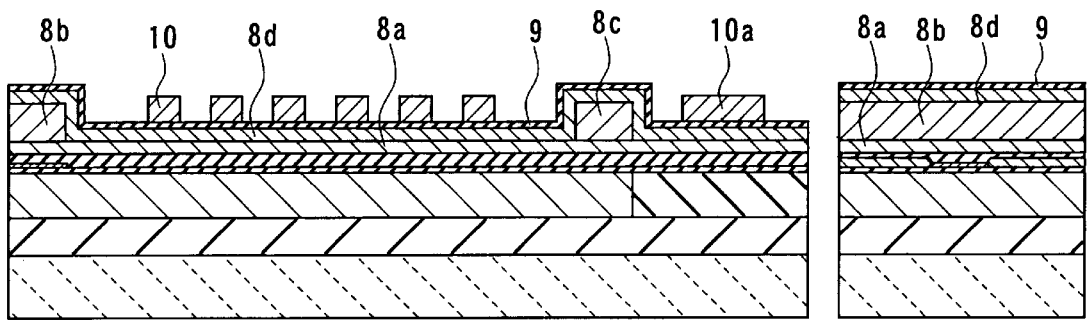 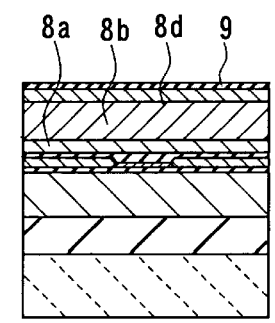
FIG. 4A                    FIG. 4B
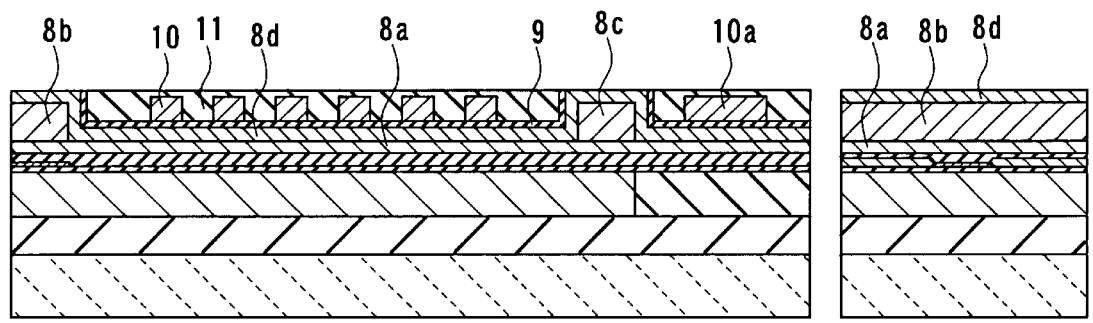 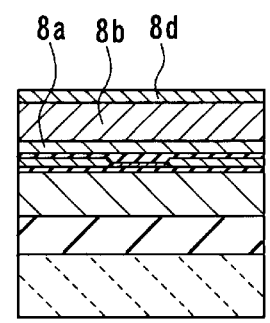
FIG. 5A                    FIG. 5B

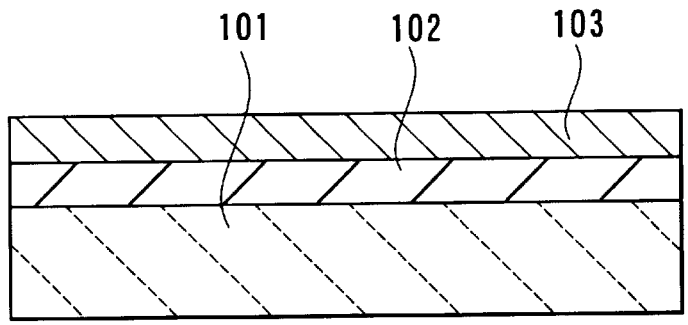
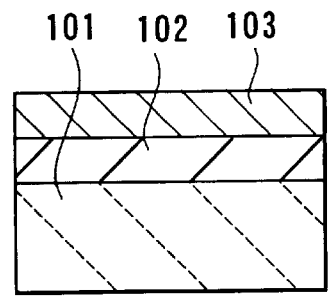
FIG. 14A
RELATED ART
FIG. 14B
RELATED ART
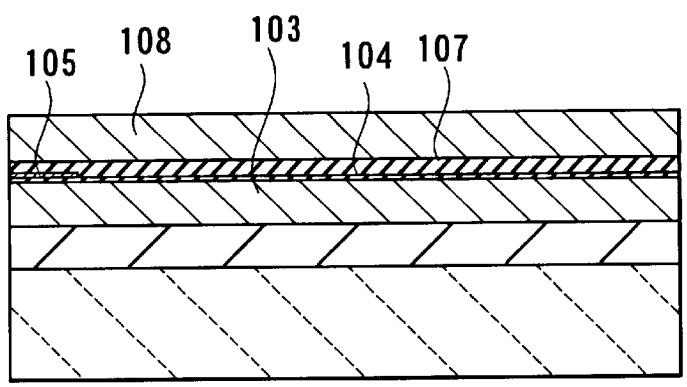
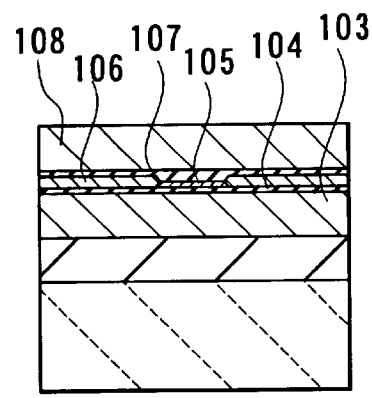
FIG. 15A
RELATED ART
FIG. 15B
RELATED ART

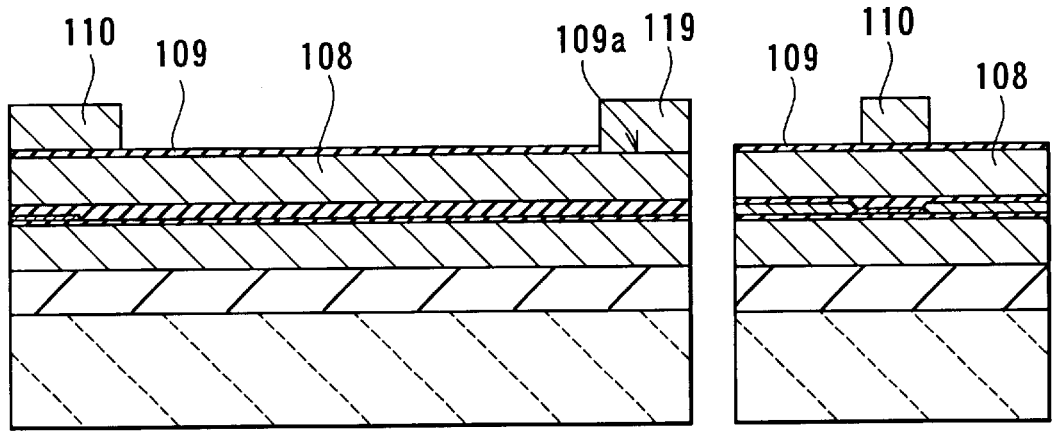
FIG. 16A
RELATED ART
FIG. 16B
RELATED ART
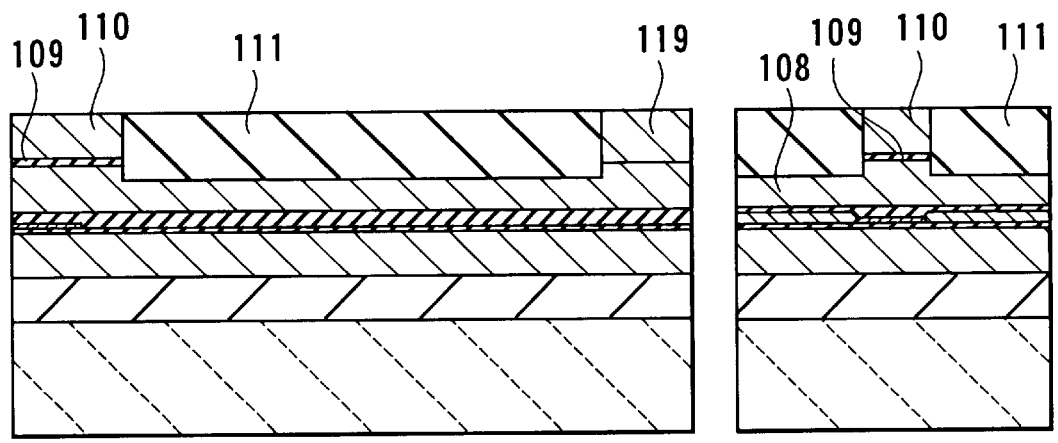
FIG. 17A
RELATED ART
FIG. 17B
RELATED ART

THIN-FILM MAGNETIC HEAD HAVING A MAGNETIC LAYER INCLUDING AN AUXILIARY LAYER MADE OF A HIGH SATURATION FLUX DENSITY MATERIAL AND METHOD OF MANUFACTURING SAME

BACKGROUND OF THE INVENTION

1. Field of the Invention

The present invention relates to a composite thin-film magnetic head comprising a recording head and a reproducing head and a method of manufacturing such a thin-film magnetic head.

2. Description of the Related Art

Performance improvements in thin-film magnetic heads have been sought as surface recording density of hard disk drives has increased. Composite thin-film magnetic heads have been widely used. A composite head is made of a layered structure including a recording head having an induction magnetic transducer for writing and a reproducing head having a magnetoresistive (MR) element for reading. MR elements include an anisotropic magnetoresistive (AMR) element that utilizes the AMR effect and a giant magnetoresistive (GMR) element that utilizes the GMR effect. A reproducing head using an AMR element is called an AMR head or simply an MR head. A reproducing head using a GMR element is called a GMR head. An AMR head is used as a reproducing head whose surface recording density is more than 1 gigabit per square inch. A GMR head is used as a reproducing head whose surface recording density is more than 3 gigabits per square inch.

The performance of the reproducing head is improved by replacing the AMR film with a GMR film and the like with an excellent magnetoresistive sensitivity. Alternatively, a pattern width such as an MR height, in particular, may be optimized. The MR height is the length (height) between an end of the MR element closer to the air bearing surface and the other end. The MR height is controlled by an amount of lapping when the air bearing surface is processed. The air bearing surface is a surface of the thin-film magnetic head facing toward a magnetic recording medium and may be called a track surface, too.

Performance improvements in a recording head are also required as the performance of a reproducing head is improved. One of the factors that determine the recording head performance is a pattern width such as a throat height (TH), in particular. The throat height is the length (height) of portions of magnetic pole layers facing each other with a recording gap layer in between, between the air-bearing-surface-side end and the other end. A reduction in throat height is desired in order to improve the recording head performance. The throat height is controlled as well by an amount of lapping when the air bearing surface is processed.

It is required to increase the track density on a magnetic recording medium in order to increase recording density among the performance characteristics of a recording head. To achieve this, it is required to implement a recording head of a narrow track structure wherein the width of top and bottom poles sandwiching the recording gap layer on a side of the air bearing surface is reduced down to a submicron order. Semiconductor process techniques are utilized to implement such a structure.

As thus described, it is important to fabricate well-balanced recording and reproducing heads to improve the performance of a thin-film magnetic head.

Reference is now made to FIG. 14A to FIG. 19A, FIG. 14B to FIG. 19B, and FIG. 20 to describe an example of a method of manufacturing a composite thin-film magnetic head as an example of a related-art method of manufacturing a thin-film magnetic head. FIG. 14A to FIG. 19A are cross sections each orthogonal to the air bearing surface of the thin-film magnetic head. FIG. 14B to FIG. 19B are cross sections of a pole portion of the head each parallel to the air bearing surface.

In the manufacturing method, as shown in FIG. 14A and FIG. 14B, an insulating layer 102 made of alumina ($Al_2O_3$), for example, having a thickness of about 5 to 10 μm is deposited on a substrate 101 made of aluminum oxide and titanium carbide ($Al_2O_3$—TiC), for example. On the insulating layer 102 a bottom shield layer 103 made of a magnetic material is formed for making a reproducing head.

Next, as shown in FIG. 15A and FIG. 15B, on the bottom shield layer 103, alumina, for example, is deposited to a thickness of 100 to 200 nm through sputtering to form a bottom shield gap film 104 as an insulating layer. On the bottom shield gap film 104 an MR film having a thickness of tens of nanometers is formed for making an MR element 105 for reproduction. Next, on the MR film a photoresist pattern is selectively formed where the MR element 105 is to be formed. The photoresist pattern is formed into a shape that facilitates lift-off, such as a shape having a T-shaped cross section. Next, with the photoresist pattern as a mask, the MR film is etched through ion milling, for example, to form the MR element 105. The MR element 105 may be either a GMR element or an AMR element. Next, on the bottom shield gap film 104, a pair of electrode layers 106 are formed, using the photoresist pattern as a mask. The electrode layers 106 are electrically connected to the MR element 105.

Next, a top shield gap film 107 is formed as an insulating layer on the bottom shield gap film 104 and the MR element 105. The MR element 105 is embedded in the shield gap films 104 and 107.

Next, on the top shield gap film 107, a top-shield-layer-cum-bottom-pole-layer (called a bottom pole layer in the following description) 108 having a thickness of about 3 μm is formed. The bottom pole layer 108 is made of a magnetic material and used for both a reproducing head and a recording head. Next, on the bottom pole layer 108, a recording gap layer 109 made of an insulating film such as an alumina film whose thickness is 0.2 μm is formed.

Next, as shown in FIG. 16A and FIG. 16B, a portion of the recording gap layer 109 is etched to form a contact hole 109a to make a magnetic path. On the recording gap layer 109 in the pole portion, a top pole tip 110 made of a magnetic material such as Permalloy (NiFe) or FeN as a high saturation flux density material and having a thickness of 0.5 to 1.0 μm is formed for the recording head. At the same time, a magnetic layer 119 made of a magnetic material is formed for making the magnetic path in the contact hole 109a for making the magnetic path.

Next, as shown in FIG. 17A and FIG. 17B, the recording gap layer 109 and the bottom pole layer 108 are etched through ion milling, using the top pole tip 110 as a mask. As shown in FIG. 17B, the structure is called a trim structure wherein the sidewalls of the top pole (the top pole tip 110), the recording gap layer 109, and part of the bottom pole layer 108 are formed vertically in a self-aligned manner. The trim structure suppresses an increase in the effective track width due to expansion of a magnetic flux generated during writing in a narrow track.

Next, an insulating layer 111 made of an alumina film, for example, and having a thickness of about 3 μm is formed on the entire surface. The insulating layer 111 is then polished to the surfaces of the top pole tip 110 and the magnetic layer 119 and flattened. The polishing method may be mechanical polishing or chemical mechanical polishing (CMP). Through this polishing, the surfaces of the top pole tip 110 and the magnetic layer 119 are exposed.

Next, as shown in FIG. 18A and FIG. 18B, on the flattened insulating layer 111, a thin-film coil 112 of a first layer is made of copper (Cu), for example, for the induction-type recording head. Next, a photoresist layer 113 is formed into a specific pattern on the insulating layer 111 and the coil 112. Heat treatment is then performed to flatten the surface of the photoresist layer 113. On the photoresist layer 113, a thin-film coil 114 of a second layer is then formed. Next, a photoresist layer 115 is formed into a specific pattern on the photoresist layer 113 and the coil 114. Heat treatment is then performed to flatten the surface of the photoresist layer 115.

Next, as shown in FIG. 19A and FIG. 19B, a top pole layer 116 is formed for the recording head on the top pole tip 110, the photoresist layers 113 and 115, and the magnetic layer 119. The top pole layer 116 is made of a magnetic material such as Permalloy. Next, an overcoat layer 117 of alumina, for example, is formed to cover the top pole layer 116. Finally, machine processing of the slider is performed to form the air bearing surface 118 of the recording head and the reproducing head. The thin-film magnetic head is thus completed. FIG. 20 is a top view of the thin-film magnetic head. The overcoat layer 117 is omitted in FIG. 20.

In FIG. 19A, 'TH' indicates the throat height and 'MR-H' indicates the MR height. In FIG. 19B, 'P2W' indicates the pole width, that is, the recording track width. In addition to the throat height, the MR height and so on, the apex angle as indicated with θ in FIG. 19A is one of the factors that determine the performance of a thin-film magnetic head. The apex is a hill-like raised portion of the coils covered with the photoresist layers 113 and 115. The apex angle is the angle formed between the top surface of the insulating layer 111 and the straight line drawn through the edges of the pole-side lateral walls of the apex.

In order to improve the performance of the thin-film magnetic head, it is important to precisely form throat height TH, MR height MR-H, apex angle θ, and track width P2W as shown in FIG. 19A and FIG. 19B.

To achieve high surface recording density, that is, to fabricate a recording head with a narrow track structure, it has been particularly required that track width P2W fall within the submicron order of 1.0 μm or less. It is therefore required to process the top pole into the submicron order through semiconductor process techniques. As the narrow track structure is obtained, it is also desired that the pole is made of a magnetic material having a high saturation flux density.

In Published Unexamined Japanese Patent Application Hei 7-262519 (1995) and in U. S. Pat. No. 5,606,478, for example, examples are disclosed, wherein a top pole layer or part of a bottom pole layer is made of a high saturation flux density material.

A problem is that it is difficult to form the top pole layer on the apex into small dimensions.

As disclosed in Published Unexamined Japanese Patent Application Hei 7-262519, for example, frame plating may be used as a method for fabricating the top pole layer. In this case, a thin electrode film made of Permalloy, for example, is formed by sputtering, for example, to fully cover the apex. Next, a photoresist is applied to the top of the electrode film and patterned through a photolithography process to form a frame to be used for plating. The top pole layer is then formed by plating through the use of the electrode film previously formed as a seed layer.

However, there is a difference in height between the apex and the other part, such as 7 to 10 μm or more. The photoresist whose thickness is 3 to 4 μm is applied to cover the apex. If the photoresist thickness is required to be at least 3 μm over the apex, a photoresist film having a thickness of 8 to 10 μm or more, for example, is formed below the apex since the fluid photoresist goes downward.

To implement a recording track width of the submicron order as described above, it is required to form a frame pattern of the submicron order through the use of a photoresist film. Therefore, it is required to form a fine pattern of the submicron order through the use of a photoresist film having a thickness of 8 to 10 μm or more. However, it is extremely difficult to form a photoresist pattern having such a thickness into a reduced pattern width, due to restrictions in a manufacturing process.

Furthermore, rays of light used for exposure of photolithography are reflected off the base electrode film as the seed layer. The photoresist is exposed to the reflected rays as well and the photoresist pattern may be out of shape. It is therefore impossible to obtain a sharp and precise photoresist pattern.

As thus described, it is difficult in related art to fabricate the top pole layer with accuracy if the pole width of the submicron order is required.

To overcome the problems thus described, a method has been taken, as shown in the foregoing related-art manufacturing steps illustrated in FIG. 16A to FIG. 19A and FIG. 16B to FIG. 19B. In this method, a track width of 1.0 μm or less is formed through the use of the top pole tip 110 effective for making a narrow track of the recording head. The top pole layer 116 to be a yoke portion connected to the top pole tip 110 is then fabricated (as disclosed in Published Unexamined Japanese Patent Application Sho 62-245509 [1987] and Published Unexamined Japanese Patent Application Sho 60-10409 [1985]). That is, the ordinary top pole layer is divided into the top pole tip 110 and the top pole layer 116 to be the yoke portion in this method. As a result, the top pole tip 110 that defines the track width is formed into a submicron width on the flat top surface of the recording gap layer 109.

However, the following problems are still found in such a thin-film magnetic head.

(1) In the related-art thin-film magnetic head shown in FIG. 19A and FIG. 19B, the track width of the recording head is defined by the top pole tip 110. Therefore, it is not necessary that the top pole layer 116 is processed into dimensions as small as those of the top pole tip 110. However, if the track width of the recording head is extremely reduced, that is, 0.5 μm or less, in particular, processing accuracy for achieving the submicron order width is required for the top pole layer 116, too. However, the top pole layer 116 is formed on top of the apex in the related-art head. Therefore, it is difficult to reduce the top pole layer 116 in size, due to the reason described above. In addition, the top pole layer 116 is required to be greater than the top pole tip 110 in width since the top pole layer 116 is required to be magnetically connected to the top pole tip 110 smaller in width. Because of these reasons, the top pole layer 116 is greater than the top pole tip 110 in width in the related-art head. As a result, writing may be performed on a side of the top pole layer 116 and so-called 'side write' may results, that is, data is written in a region of a recording medium where data is not supposed to be written. Such a problem more frequently results when the coil is two-layer or three-layer to improve the performance of the recording head and the apex is thereby increased in height, compared to the case where the coil is one-layer.

(2) In the related-art magnetic head, the throat height is defined by the end of the top pole tip 110 opposite to the air bearing surface 118. However, if the top pole tip 110 is reduced in width, edges of the pattern are rounded in a photolithography process. As a result, the throat height that is required to be precisely controlled is made uneven, and the balance between the throat height and the track width of the MR element is disturbed in the steps of lapping the air bearing surface 118. For example, if the track width of 0.5 to 0.6 $\mu$m is required, the end of the top pole tip 110 opposite to the air bearing surface 118 may be shifted from the zero throat height position (that is, the position of the air-bearing-surface-side end of the insulating layer that defines the throat height) toward the air bearing surface 118. The recording gap is thus made greater and writing of data is made impossible.

Due to the problems (1) and (2) thus described, it is difficult to reduce the track width of the recording head of the related-art thin-film magnetic head.

(3) Furthermore, in the related-art magnetic head, it is difficult to reduce the magnetic path (yoke) length. That is, if the coil pitch is reduced, a head with a reduced yoke length is achieved and a recording head having an excellent high frequency characteristic is achieved, in particular. However, if the coil pitch is reduced to the limit, the distance between the zero throat height position and the outermost end of the coil is a major factor that prevents a reduction in yoke length. Since the yoke length of a two-layer coil can be shorter than that of a single-layer coil, a two-layer coil is adopted to many of recording heads for high frequency application. However, in the related-art magnetic head, a photoresist film having a thickness of about 2 $\mu$m is formed to provide an insulating film between coil layers after a first layer is formed. Consequently, a small and rounded apex is formed at the outermost end of the first layer of the coil. A second layer of the coil is then formed on the apex. The second layer is required to be formed on a flat portion since it is impossible to etch the seed layer of the coil in the sloped portion of the apex, and the coil is thereby shorted.

Therefore, if the total coil thickness is 2 to 3 $\mu$m, the thickness of the insulating film between the layers of the coil is 2 $\mu$m, and the apex angle is 45 to 55 degrees, for example, the yoke length is required to be 8 to 10 $\mu$m which is twice as long as the distance between the outermost end of the coil and the neighborhood of the zero throat height position, that is, 4 to 5 $\mu$m (the distance between the innermost end of the coil and the portion where the top and bottom pole layers are connected to each other is required to be 4 to 5 $\mu$m, too), in addition to the length of the portion corresponding to the coil. This length of the portion other than the portion corresponding to the coil is one of the factors that prevent a reduction in yoke length.

Assuming that a two-layer eleven-turn coil whose line width is 1.0 $\mu$m and the space is 1.0 $\mu$m is fabricated, for example, the portion of the yoke length corresponding to the coil 112 of the first layer is 11 $\mu$m, if the first layer is made up of six turns and the second layer is made up of 5 turns, as shown in FIG. 19A and FIG. 19B. In addition to this length, the total of 8 to 10 $\mu$m, that is, the distance between each of the outermost and innermost ends of the coil 112 of the first layer and each of ends of the photoresist layer 113 for insulating the coil 112, is required for the yoke length. In the present invention, the yoke length is the length of a portion of the pole layer except the pole portion and the contact portions as indicated with $L_0$ in FIG. 19A and FIG. 19B. In the related art it is impossible to further reduce the yoke length, which prevents improvements in high frequency characteristic.

OBJECT AND SUMMARY OF THE INVENTION

It is an object of the invention to provide a thin-film magnetic head and a method of manufacturing the same for reducing a track width of a recording head and reducing a yoke length.

A thin-film magnetic head of the invention comprises: a reproducing head including: a magnetoresistive element; and a first shield layer and a second shield layer for shielding the magnetoresistive element, portions of the first and second shield layers located in regions on a side of a medium facing surface of the head that faces toward a recording medium being opposed to each other, the magnetoresistive element being placed between the portions of the shield layers; and a recording head including: a first magnetic layer and a second magnetic layer magnetically coupled to each other and including magnetic pole portions opposed to each other and placed in regions of the magnetic layers on a side of the medium facing surface, each of the magnetic layers including at least one layer; a gap layer provided between the pole portions of the first and second magnetic layers; and a thin-film coil at least part of which is placed between the first and second magnetic layers, the at least part of the coil being insulated from the first and second magnetic layers. The first magnetic layer is located next to the reproducing head and includes: a first portion located in a region including a region that faces the coil; a second portion forming one of the pole portions and connected to a surface of the first portion facing the coil; and an auxiliary layer made of a high saturation flux density material and located at least between the first portion and the at least part of the coil, the auxiliary layer forming part of a magnetic path. The at least part of the coil is located on a side of the second portion of the first magnetic layer.

A method of the invention is provided for manufacturing a thin-film magnetic head comprising: a reproducing head including: a magnetoresistive element; and a first shield layer and a second shield layer for shielding the magnetoresistive element, portions of the first and second shield layers located in regions on a side of a medium facing surface of the head that faces toward a recording medium being opposed to each other, the magnetoresistive element being placed between the portions of the shield layers; and a recording head including: a first magnetic layer and a second magnetic layer magnetically coupled to each other and including magnetic pole portions opposed to each other and placed in regions of the magnetic layers on a side of the medium facing surface, each of the magnetic layers including at least one layer; a gap layer provided between the pole portions of the first and second magnetic layers; and a thin-film coil at least part of which is placed between the first and second magnetic layers, the at least part of the coil being insulated from the first and second magnetic layers. The first magnetic layer is located next to the reproducing head. The method includes the steps of: forming the reproducing head; forming the first magnetic layer; forming the gap layer on the first magnetic layer; forming the second magnetic layer on the gap layer; and forming the coil such that the at least part of the coil is insulated from the first and second magnetic layers. The step of forming the first magnetic layer includes formation of: a first portion located in a region including a region that faces the coil; a second portion forming one of the pole portions and connected to a surface of the first portion facing the coil; and an auxiliary layer made of a high saturation flux density material and located at least between the first portion and the at least part of the coil, the auxiliary layer forming part of a magnetic path. In the step of forming the coil, the at least part of the coil is formed on the auxiliary layer such that the at least part of the coil is placed on a side of the second portion of the first magnetic layer.

According to the thin-film magnetic head or the method of manufacturing the same of the invention, the first magnetic layer is provided. The first magnetic layer includes: the first portion located in a region including a region that faces the thin-film coil; and the second portion forming the pole portion and connected to a surface of the first portion facing the coil. At least part of the coil is placed on a side of the second portion of the first magnetic layer. As a result, the second magnetic layer of the recording head is formed on the flat surface. The track width of the recording head is thereby reduced. Furthermore, according to the invention, the auxiliary layer made of a high saturation flux density material is provided at least between the first portion of the first magnetic layer and at least part of the coil. The auxiliary layer forms part of the magnetic path. As a result, the total thickness of the first portion and the auxiliary layer is reduced and it is thereby possible to increase the thickness of the coil. It is therefore possible to reduce the line width of the coil. As a result, a reduction in yoke length of the recording head is achieved.

In the present invention the high saturation flux density material is a magnetic material having saturation flux density of 1.4 T or greater.

According to the thin-film magnetic head or the method of the invention, the second portion of the first magnetic layer may define a throat height, and the second magnetic layer may define a recording track width.

According to the head or the method, the second magnetic layer may include: a magnetic pole portion layer forming one of the pole portions; and a yoke portion layer connected to the pole portion layer and forming a yoke portion. In this case, the thin-film coil may include a first layer portion located on a side of the second portion of the first magnetic layer and a second layer portion located on a side of the pole portion layer of the second magnetic layer. In this case, the pole portion layer of the second magnetic layer may be equal to or greater than the second portion of the first magnetic layer in length. An end face of the yoke portion layer that faces toward the recording medium may be located at a distance from the medium facing surface of the head.

According to the head or the method, the auxiliary layer may cover the first and second portions of the first magnetic layer.

According to the head or the method, the second portion of the first magnetic layer may be made of a high saturation flux density material.

According to the head or the method, an insulating layer may be further provided. The insulating layer covers at least part of the coil located on the side of the second portion of the first magnetic layer, a surface of the insulating layer that faces the recording gap layer being flattened. In this case, the second portion of the first magnetic layer may surround at least part of the coil.

According to the head or the method, the first magnetic layer may function as the second shield layer, too.

Other and further objects, features and advantages of the invention will appear more fully from the following description.

BRIEF DESCRIPTION OF THE DRAWINGS

FIG. 4A and FIG. 4B are cross sections for illustrating a step that follows FIG. 3A and FIG. 3B.

FIG. 5A and FIG. 5B are cross sections for illustrating a step that follows FIG. 4A and FIG. 4B.

FIG. 14A and FIG. 14B are cross sections for illustrating a step in a method of manufacturing a thin-film magnetic head of related art.

FIG. 15A and FIG. 15B are cross sections for illustrating a step that follows FIG. 14A and FIG. 14B.

FIG. 16A and FIG. 16B are cross sections for illustrating a step that follows FIG. 15A and FIG. 15B.

FIG. 17A and FIG. 17B are cross sections for illustrating a step that follows FIG. 16A and FIG. 16B.

DETAILED DESCRIPTION OF THE PREFERRED EMBODIMENTS

Preferred embodiments of the invention will now be described in detail with reference to the accompanying drawings.

[First Embodiment]

Reference is now made to FIG. 1A to FIG. 7A, FIG. 1B to FIG. 7B, and FIG. 8 to describe a thin-film magnetic head and a method of manufacturing the same of a first embodiment of the invention. FIG. 1A to FIG. 7A are cross sections each orthogonal to an air bearing surface. FIG. 1B to FIG. 7B are cross sections each parallel to the air bearing surface of the pole portion.

Figures 1A, 1B:
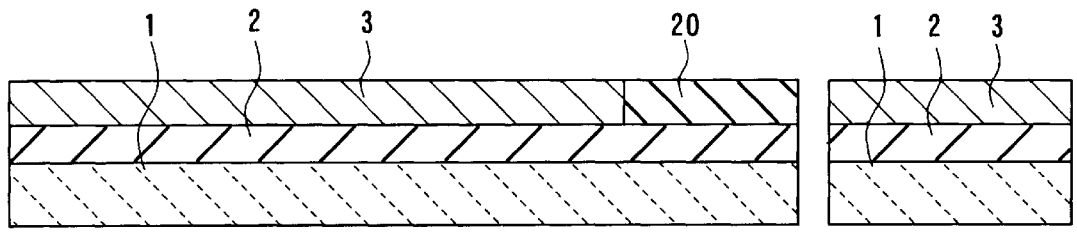
FIG. 1A and FIG. 1B are cross sections for illustrating a step in a method of manufacturing a thin-film magnetic head of a first embodiment of the invention.

In the manufacturing method, as shown in FIG. 1A and FIG. 1B, an insulating layer 2 made of alumina ($Al_2O_3$), for example, whose thickness is about 5 μm, is deposited on a substrate 1 made of aluminum oxide and titanium carbide ($Al_2O_3$—TiC), for example. On the insulating layer 2 a bottom shield layer 3 made of a magnetic material such as Permalloy and having a thickness of about 3 μm is formed for making a reproducing head. The bottom shield layer 3 is formed through plating selectively on the insulating layer 2 with a photoresist film as a mask, for example. Next, an insulating layer 20 of alumina, for example, having a thickness of 4 to 6 μm, for example, is formed over the entire surface. This insulating layer is polished through CMP, for example, so that the bottom shield layer 31 is exposed and the surface is flattened.

Figures 2A, 2B:
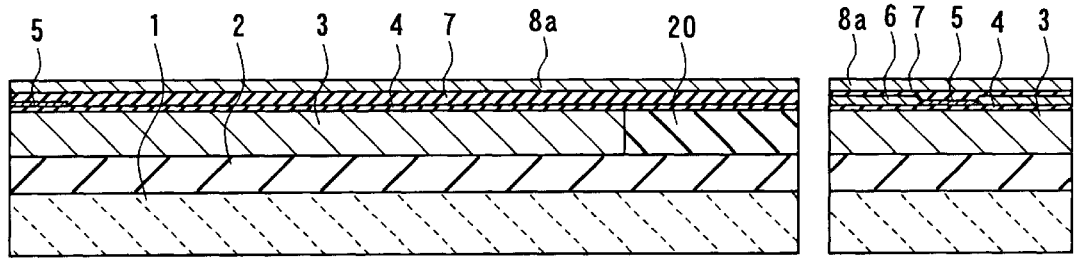
FIG. 2A and FIG. 2B are cross sections for illustrating a step that follows FIG. 1A and FIG. 1B.

Next, as shown in FIG. 2A and FIG. 2B, on the bottom shield layer 3, alumina or aluminum nitride, for example, is deposited through sputtering to form a bottom shield gap film 4 as an insulating layer. On the bottom shield gap film 4, an MR element 5 for reproduction having a thickness of tens of nanometers is formed. The MR element 5 may be fabricated through selectively etching an MR film formed through sputtering. The MR element 5 may be an element made of a magnetosensitive film exhibiting a magnetoresistivity, such as an AMR element, a GMR element, or a tunnel magnetoresistive (TMR) element. Next, on the bottom shield gap film 4, a pair of electrode layers 6 having a thickness of tens of nanometers are formed. The electrode layers 6 are electrically connected to the MR element 5. Next, a top shield gap film 7 is formed as an insulating film on the bottom shield gap film 4 and the MR element 5. The MR element 5 is embedded in the shield gap films 4 and 7.

Next, on the top shield gap film 7, a first portion 8a of a top-shield layer-cum-bottom-pole-layer (called a bottom pole layer in the following description) having a thickness of about 0.5 to 1.0 μm is selectively formed. The bottom pole layer is made of a magnetic material and used for both a reproducing head and a recording head. The first portion 8a is a potion of the bottom pole layer that is placed in a region including a region facing a thin-film coil described later.

Figures 3A, 3B:
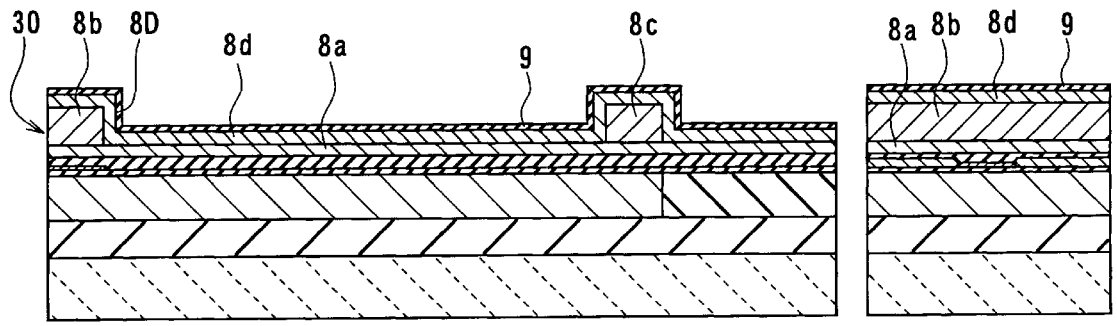
FIG. 3A and FIG. 3B are cross sections for illustrating a step that follows FIG. 2A and FIG. 2B.

Next, as shown in FIGS. 3A and 3B, a second portion 8b and a third portion 8c of the bottom pole layer, each having a thickness of about 1.5 to 2.0 μm, are formed on the first portion 8a. The second portion 8b makes up a pole portion of the bottom pole layer and is connected to a surface of the first portion 8a on which the thin-film coil is to be formed. The third portion 8c is provided for connecting the first portion 8a to a top pole layer. In this embodiment the throat height is defined by the position of an end of the second portion 8b opposite to the air bearing surface (that is, the right side of FIG. 3A). The zero throat height position is the position of an end of an auxiliary layer that will be formed at the end of the second portion 8b opposite to the air bearing surface, which will be described later.

The second portion 8b and the third portion 8c of the bottom pole layer may be made of NiFe (80 weight % Ni and 20 weight % Fe), or NiFe (45 weight % Ni and 55 weight % Fe) as a high saturation flux density material through plating or may be made of a material such as FeN or FeZrN as a high saturation flux density material through sputtering. Alternatively, a material such as CoFe or a Co-base amorphous material as a high saturation flux density material may be used.

Next, the auxiliary layer 8d made of a high saturation flux density material and having a thickness of about 0.5 to 1.5 μm is formed through sputtering, for example, to cover the first portion 8a, the second portion 8b and the third portion 8c of the bottom pole layer. The high saturation flux density material making up the auxiliary layer 8d may be FeNx or FeN, FeZrN, CoFe, a Co-base amorphous material, and so on. The auxiliary layer 8d is placed between the first portion 8a of the first magnetic layer and a first layer of the thin-film coil described later. The auxiliary layer 8d forms part of the bottom pole layer and makes up part of the magnetic path. As shown in FIG. 3A and FIG. 3B, the auxiliary layer 8d is formed on the MR element 5 such that the position of an end 8D of a portion located on a side of the second portion 8b of the first magnetic layer is located near an end of the MR element 5 opposite to the air bearing surface 30, the end 8D being opposite to the air bearing surface 30 (that is, on the right side of FIG 3A). The position of the end 8D of the auxiliary layer 8d is the zero throat height position.

Next, an insulating film 9 of alumina, for example, is formed over the entire surface. The thickness of the insulating film 9 is about 0.3 to 0.6 μm.

Next, as shown in FIGS. 4A and 4B, a first layer 10 of the thin-film coil made of copper (Cu), for example, is formed by frame plating. For example, the thickness of the first layer 10 is about 1.0 to 2.0 μm. Numeral 10a in the drawings indicates a portion for connecting the first layer 10 to a second layer of the coil described later.

Next, as shown in FIG. 5A and FIG. 5B, an insulating layer 11 of alumina, for example, having a thickness of about 3 to 4 μm is formed over the entire surface. The insulating layer 11 is then polished through CMP, for example, until portions of the auxiliary layer 8d located on top of the second portion 8b and the third portion 8c of the bottom pole layer are exposed, and the surface is flattened. Although the first layer 10 of the coil is not exposed in FIG. 5A and FIG. 5B, the first layer 10 may be exposed. If the first layer 10 is exposed, the other insulating layer is formed on the first layer 10 and the insulating layer 11.

Figures 6A, 6B:
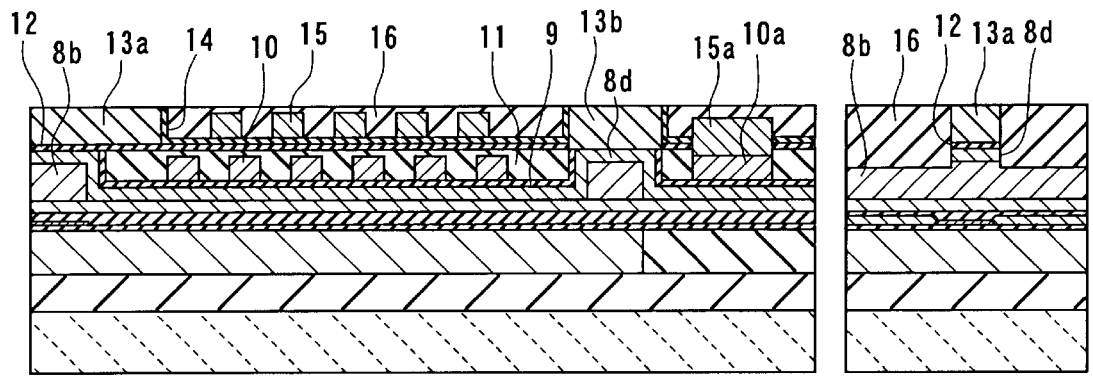
FIG. 6A and FIG. 6B are cross sections for illustrating a step that follows FIG. 5A and FIG. 5B.

Next, as shown in FIG. 6A and FIG. 6B, a recording gap layer 12 made of an insulating material whose thickness is about 0.2 to 0.3 μm, for example, is formed on the auxiliary layer 8d and the insulating layer 11 exposed. In general, the insulating material used for the recording gap layer 12 may be alumina, aluminum nitride, a silicon-dioxide-base material, a silicon-nitride-base material, or diamond-like carbon (DLC) and so on.

Next, a portion of the recording gap layer 12 located on a portion of the auxiliary layer 8d on top of the third portion 8c is etched to form a contact hole for making the magnetic path. In addition, a portion of the recording gap layer 12 and the insulating layer 11 on the connecting portion 10a of the first layer 10 of the coil is etched to form a contact hole so as to connect the second layer of the coil to the portion 10a.

Next, on the recording gap layer 12, a pole portion layer 13a having a thickness of 1.0 to 3.0 μm is formed. The pole portion layer 13a forms the pole portion of the top pole layer. A magnetic layer 13b having a thickness of 1.0 to 3.0 μm is formed in the contact hole formed in the portion on top of the auxiliary layer 8d located on the third portion 8c of the bottom pole layer. The magnetic layer 13b is a portion for connecting a yoke portion layer of the top pole layer described later to the bottom pole layer. The magnetic layer 13b is greater than the third portion 8c. In this embodiment the pole portion layer 13a of the top pole layer is equal to or greater than the second portion 8b of the bottom pole layer in length.

The pole portion layer 13a and the magnetic layer 13b of the top pole layer may be made of NiFe (80 weight % Ni and 20 weight % Fe), or NiFe (45 weight % Ni and 55 weight % Fe) as a high saturation flux density material through plating or may be made of a material such as FeN or FeZrN as a high saturation flux density material through sputtering. Alternatively, a material such as CoFe or a Co-base amorphous material as a high saturation flux density material may be used.

Next, the recording gap layer 12 is selectively etched through dry etching, using the pole portion layer 13a as a mask. The dry etching may be reactive ion etching (RIE) using a chlorine-base gas such as $BCl_2$ or $Cl_2$, or a fluorine-base gas such as $CF_4$ or $SF_6$, for example. Next, the second portion 8b of the bottom pole layer is selectively etched by about 0.3 to 0.6 μm through argon ion milling, for example. A trim structure as shown in FIG. 6B is thus formed. The trim structure suppresses an increase in the effective track width due to expansion of a magnetic flux generated during writing in a narrow track.

Next, an insulating film 14 of alumina, for example, is formed on the recording gap layer 12 where the coil is to be formed. The thickness of the insulating film 14 is about 0.3 to 0.6 μm.

Next, the second layer 15 of the thin-film coil made of copper (Cu), for example, is formed by frame plating. For example, the thickness of the second layer 15 is about 1.0 to 2.0 μm. Numeral 15a in the drawings indicates a portion to be connected to the portion 10a of the first layer 10.

Next, an insulating layer 16 of alumina, for example, having a thickness of about 3 to 4 μm is formed over the entire surface. The insulating layer 16 is then polished through CMP, for example, so that the pole portion layer 13a and the magnetic layer 13b of the top pole layer are exposed, and the surface is flattened.

Figures 7A, 7B:
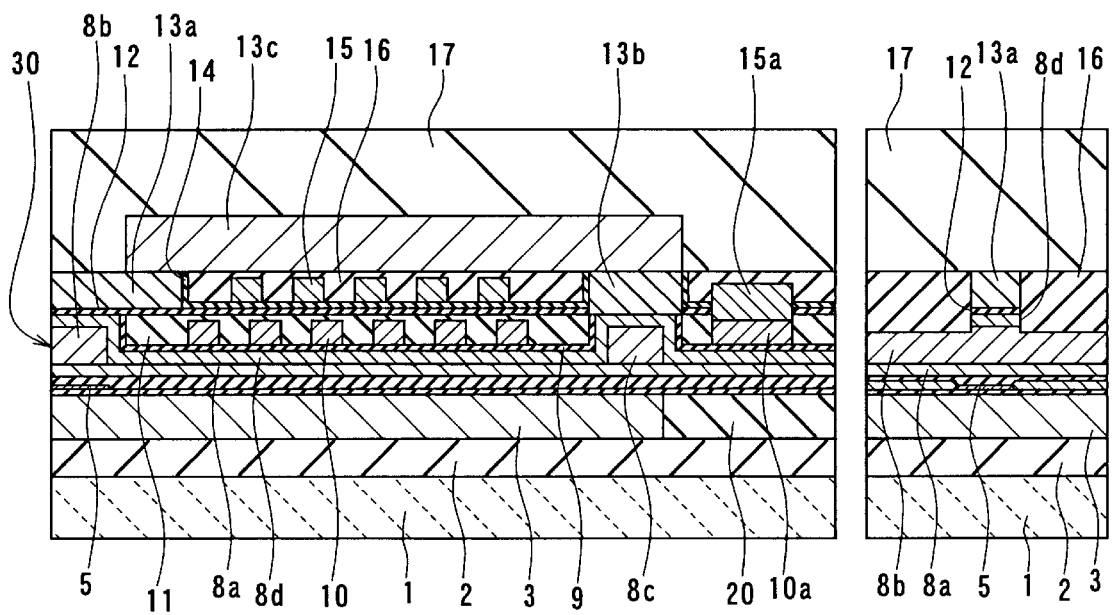
FIG. 7A and FIG. 7B are cross sections for illustrating a step that follows FIG. 6A and FIG. 6B.

Next, as shown in FIG. 7A and FIG. 7B, on the pole portion layer 13a and the magnetic layer 13b of the top pole layer and the insulating layer 16 that have been flattened, the yoke portion layer 13c having a thickness of about 2 to 4 μm is formed for the recording head. The yoke portion layer 13c is made of a magnetic material and makes up a yoke portion of the top pole layer. Through the magnetic layer 13b, the yoke portion layer 13c is in contact with and magnetically coupled to a portion of the auxiliary layer 8d located on top of the third portion 8c of the bottom pole layer. The yoke portion layer 13c may be made of NiFe (80 weight % Ni and 20 weight % Fe), or NiFe (45 weight % Ni and 55 weight % Fe) as a high saturation flux density material through plating or may be made of a material such as FeN or FeZrN as a high saturation flux density material through sputtering. Alternatively, a material such as CoFe or a Co-base amorphous material as a high saturation flux density material may be used. To improve the high frequency characteristic, the yoke portion layer 13c may be made of a number of layers of inorganic insulating films and magnetic layers of Permalloy, for example.

In this embodiment an end face of the yoke portion layer 13c that faces toward a recording medium (that is, on a side of the air bearing surface 30) is located at a distance from a surface of the thin-film magnetic head facing toward the recording medium (that is, on a right side of FIG. 7A).

Next, an overcoat layer 17 of alumina, for example, having a thickness of 20 to 40 μm is formed over the entire surface. The surface of the overcoat layer 17 is then flattened and pads (not shown) for electrodes are formed on the overcoat layer 17. Finally, lapping of the slider including the foregoing layers is performed to form the air bearing surfaces 30 of the recording head and the reproducing head. The thin-film magnetic head of the embodiment is thus completed.

In this embodiment the bottom pole layer made up of the first portion 8a, the second portion 8b, the third portion 8c and the auxiliary layer 8d corresponds to the first magnetic layer of the invention. The top pole layer made up of the pole portion layer 13a, the magnetic layer 13b and the yoke portion layer 13c corresponds to the second magnetic layer of the invention. Since the bottom pole layer also functions as the top shield layer, the bottom pole layer corresponds to a second shield layer of the invention, too.

Figure 8:
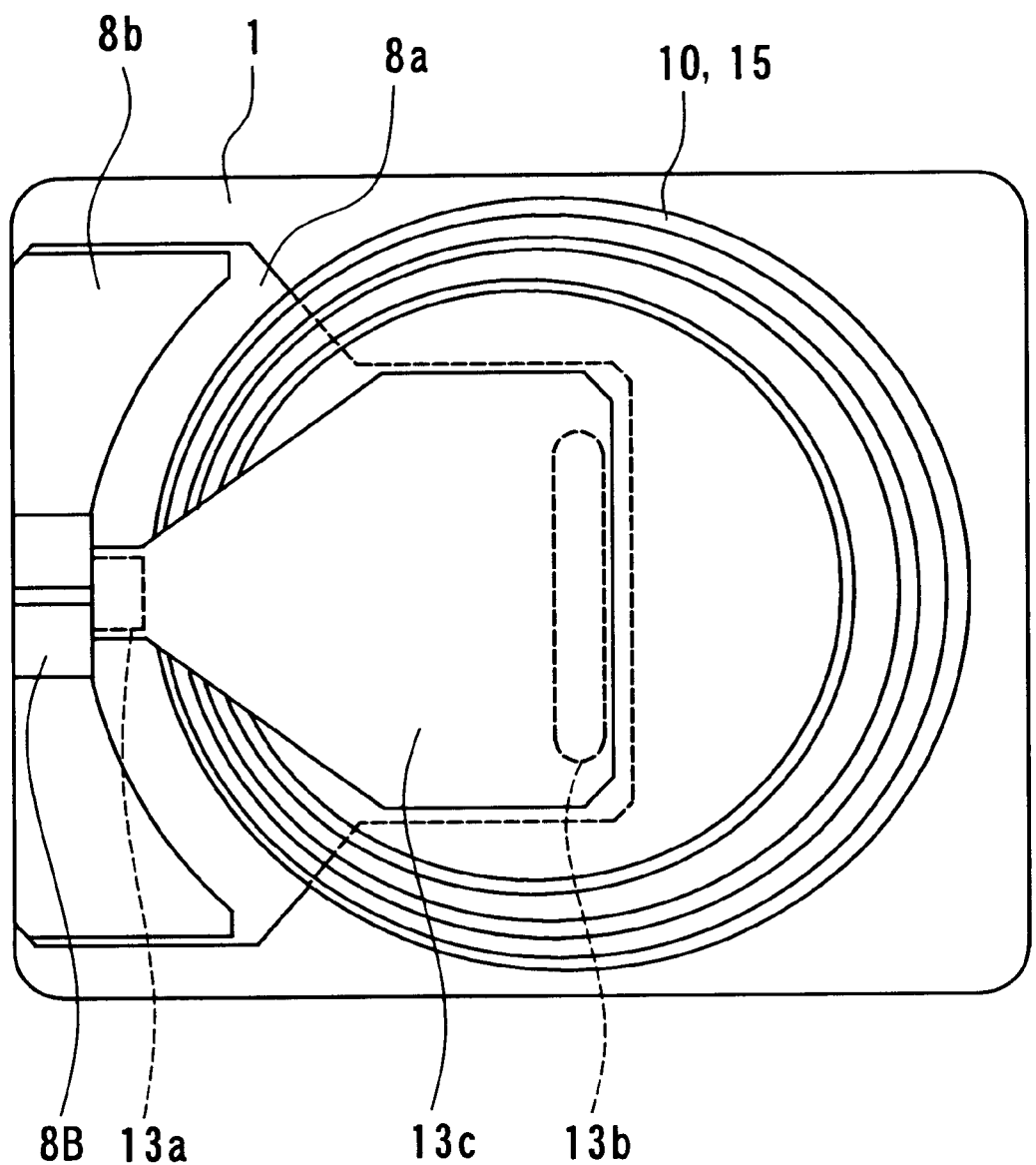
FIG. 8 is a top view of the thin-film magnetic head of the first embodiment.

FIG. 8 is a top view of the thin-film magnetic head of the embodiment manufactured as described above. The overcoat layer 17 is omitted in FIG. 8. In FIG. 8 numeral 8B indicates a portion of the second portion 8b of the bottom pole layer etched to make the trim structure.

Figures 9A, 9B:
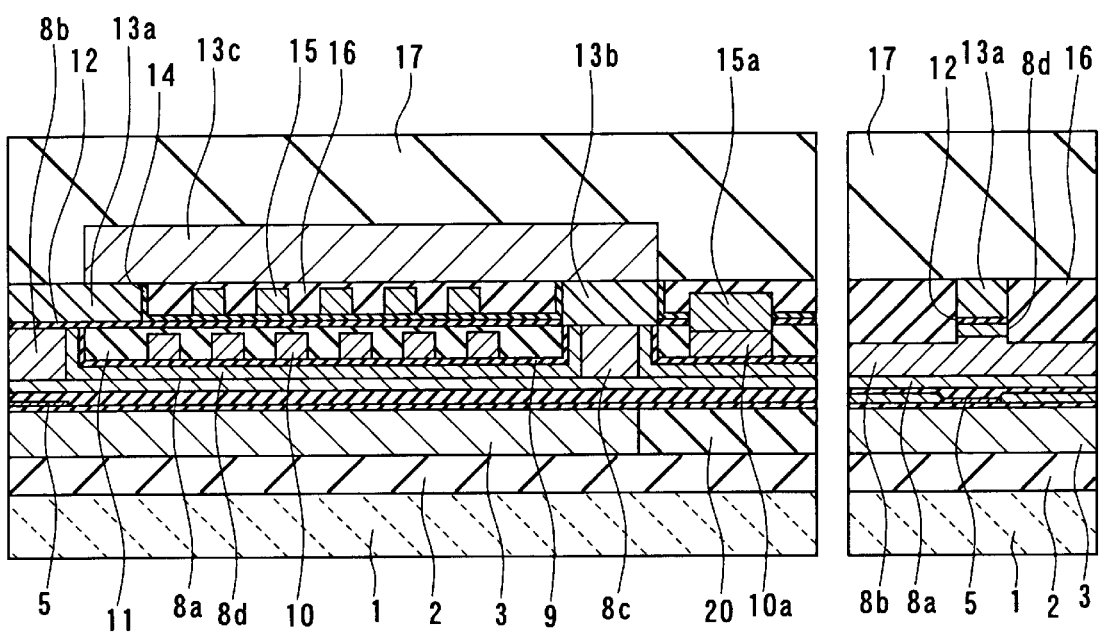
FIG. 9A and FIG. 9B are cross sections of a modification example of the thin-film magnetic head of the first embodiment.

FIG. 9A and FIG. 9B are cross sections of a modification example of the thin-film magnetic head of the embodiment. In this example the auxiliary layer 8d is not formed on top of the first portion 8a and the third portion 8c of the bottom pole layer.

Figures 10A, 10B:
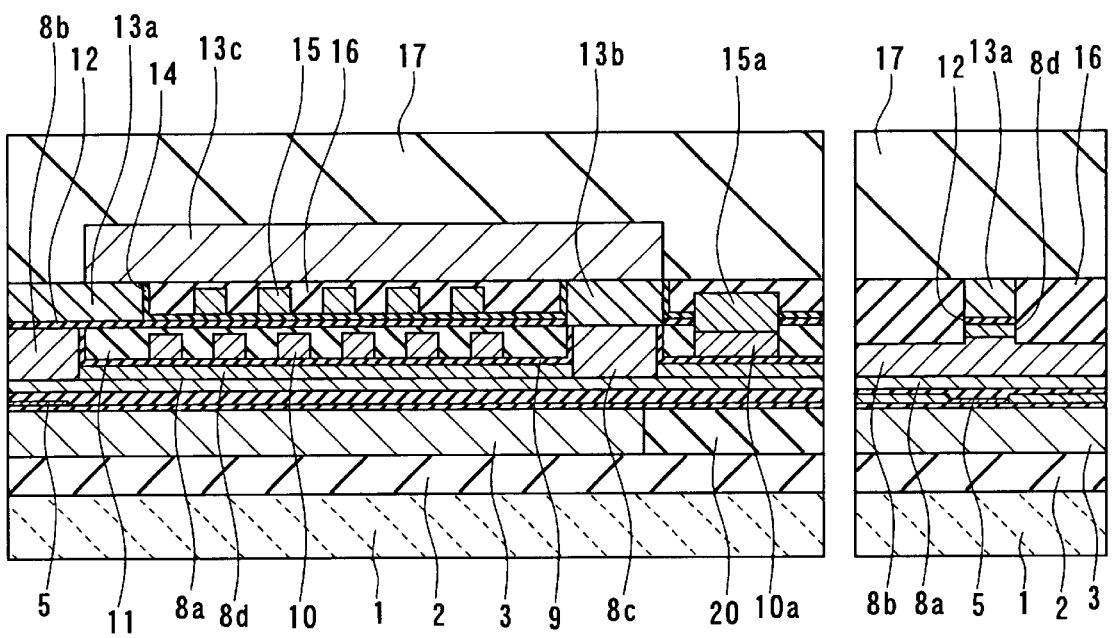
FIG. 10A and FIG. 10B are cross sections of another modification example of the thin-film magnetic head of the first embodiment.

FIG. 10A and FIG. 10B are cross sections of another modification example of the thin-film magnetic head of the embodiment. In this example the auxiliary layer 8d is not formed on top of the first portion 8a and on a sidewall thereof and on top of the third portion 8c and on a sidewall thereof.

As described so far, the thin-film magnetic head of the embodiment comprises the reproducing head and the recording head. The reproducing head has: the MR element 5; and the bottom shield layer 3 and the top shield layer (bottom pole layer) for shielding the MR element 5. Portions of the bottom shield layer 3 and the top shield layer facing toward a recording medium are opposed to each other, the MR element 5 being placed between the portions. The recording head has the bottom pole layer and the top pole layer magnetically coupled to each other, each of which includes at least one layer. The bottom pole layer and the top pole layer include pole portions opposed to each other and placed in regions on a side of the medium facing surface. The recording head further has: the recording gap layer 12 placed between the pole portion of the bottom pole layer and the pole portion of the top pole layer; and the layers 10 and 15 of the thin-film coil at least part of which is placed between the bottom pole layer and the top pole layer, the at least part of the coil being insulated from the bottom pole layer and the top pole layer.

In the embodiment the bottom pole layer has: the first portion 8a placed in a region including a region facing the first layer 10 of the thin-film coil; and the second portion 8b connected to a surface of the first portion 8a facing the first layer 10 of the coil. The second portion 8b forms the pole portion. The first layer 10 of the coil is placed on a side of the second portion 8b. In this embodiment the bottom pole layer further has the auxiliary layer 8d made of a high saturation flux density material and placed at least between the first portion 8a and the first layer 10 of the coil. The auxiliary layer 8d forms part of the magnetic path.

In the embodiment the first layer 10 of the thin-film coil is placed on top of the first portion 8a and on the side of the second portion 8b of the bottom pole layer, and the top surface of the insulating layer 11 that covers the first layer 10 is flattened. As a result, the pole portion layer 13a of the top pole layer that defines the track width of the recording head is formed on the flat surface. Therefore, according to the embodiment, the dimensions of the pole portion layer 13a are reduced to the half-micron order or quarter-micron order. The track width of the recording head is thereby reduced.

According to the embodiment, the second layer 15 of the thin-film coil is placed on a side of the pole portion layer 13a of the top pole layer. Consequently, the yoke portion layer 13c of the recording head is formed on the flat surface, too. As a result, the yoke portion layer 13c is reduced in size, and side write is prevented.

According to the embodiment, the throat height is not defined by the pole portion layer 13a of the top pole layer that defines the track width of the recording head, but by the second portion 8b of the bottom pole layer. As a result, the throat height is uniformly defined with precision even if the track width is reduced.

In the case of a composite thin-film magnetic head used in a hard disk drive, the length between the reproducing and recording heads is required to fall within a specific range due to specifications of the device. Consequently, the thickness of the bottom pole layer is required to fall within a specific range, such as 3.0 to 3.5 $\mu$m. Therefore, if the first layer 10 of the coil is placed on top of the first portion 8a and on a side of the second portion 8b of the bottom pole layer as in the embodiment in order to achieve a narrow track, it is difficult in some cases to obtain sufficient thicknesses of the first portion 8a and the first layer 10 of the coil. If the thickness of the first portion 8a is too small, it is difficult to obtain sufficient flux density of the bottom pole layer. If the thickness of the first layer 10 of the coil is too small, the resistance of the coil is increased.

Therefore, in the embodiment, the auxiliary layer 8d made of a high saturation flux density material is provided on top of the first portion 8a of the bottom pole layer. As a result, the total thickness of the first portion 8a and the auxiliary layer 8d is reduced to some extent while sufficient flux density of the bottom pole layer is obtained. According to the embodiment, the first layer 10 of the coil has a sufficient thickness. It is therefore possible to reduce the line width of the first layer 10 of the coil without increasing the resistance of the coil. As a result, a reduction in yoke length of the recording head is achieved.

According to the embodiment, both the first layer 10 and the second layer 15 of the thin-film coil are formed on the flat surface. It is thereby possible to reduce the size of the first layer 10 and the second layer 15 of the coil. In addition, no extra length due to the existence of a sloped portion of the apex is required. A reduction in yoke length of the recording head is achieved because of this feature, too.

According to the embodiment, the yoke length of the recording head is reduced by about 50 percent or more of that of a prior-art head, for example. It is therefore possible to provide a thin-film magnetic head having a recording head with an excellent high frequency characteristic, an excellent nonlinear transition shift (NLTS) characteristic and an excellent overwrite property that is a parameter indicating one of characteristics when data is written over existing data, according to the embodiment.

According to the embodiment, the overwrite property is improved since the auxiliary layer 8d made of a high saturation flux density material is provided. The overwrite property is further improved if the second portion 8b of the bottom pole layer and the pole portion layer 13a of the top pole layer are made of a high saturation flux density material.

According to the embodiment, since the auxiliary layer 8d made of a high saturation flux density material is provided, the first portion 8a of the bottom pole layer may be made of a magnetic material other than a high saturation flux density material without reducing NLTS. For example, this feature is effective when the first portion 8a is made of normal Permalloy, that is, NiFe (80 weight % Ni and 20 weight % Fe).

According to the embodiment, an end face of the yoke portion layer 13c that faces toward the air bearing surface is located at a distance from the air bearing surface of the thin-film magnetic head. Therefore, it is impossible that the yoke portion layer 13c is exposed from the air bearing surface even if the throat height is low. As a result, side write is prevented.

According to the embodiment, the insulating layer 11 is provided to cover the first layer 10 of the coil placed on a side of the second portion 8b of the bottom pole layer. The top surface of the insulating layer 11 is flattened. It is therefore easy to form the recording gap layer 12, the top pole layer and the second layer 15 of the coil and so on that are fabricated later.

According to the embodiment, the inorganic insulating film 9 that is thin and achieves sufficient insulation strength is provided between the bottom pole layer and the first layer 10 of the coil. High insulation strength is thereby obtained between the bottom pole layer and the first layer 10. The inorganic insulating film 14 is provided, in addition to the recording gap layer 12, between the first layer 10 and the second layer 15 of the coil. As a result, high insulation strength is obtained between the first layer 10 and the second layer 15, and leakage flux from the layers 10 and 15 of the coil is reduced.

According to the embodiment, as shown in FIG. 8, a portion of the pole portion layer 13a of the top pole layer further from the air bearing surface than the zero throat height position or a neighborhood thereof has a specific width of 3 $\mu$m or greater, for example. A portion of the pole portion layer 13a closer to the air bearing surface than the zero throat height position or a neighborhood thereof has a specific width of the half-micron or quarter-micron order. As a result, a magnetic flux passing through the top pole layer will not saturate in the portion further from the air bearing surface than the zero throat height position or a neighborhood thereof, but saturates in the portion closer to the air bearing surface than the zero throat height position or a neighborhood thereof It is thereby possible to improve NLTS and the overwrite property.

[Second Embodiment]

Figures 11A, 11B:
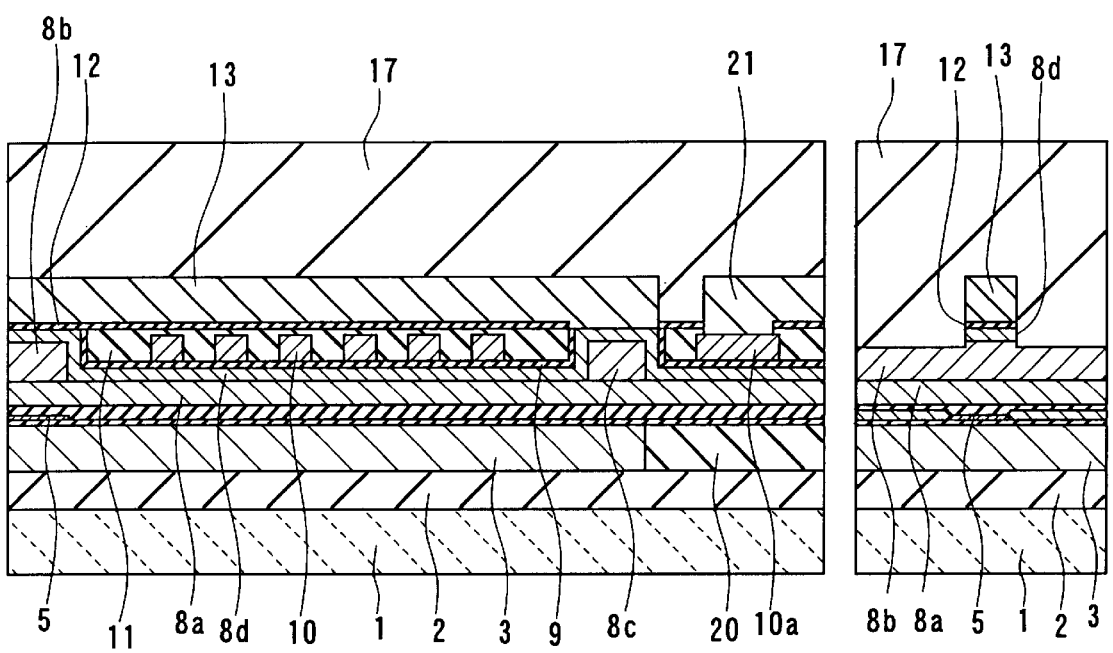
FIG. 11A and FIG. 11B are cross sections of a thin-film magnetic head of a second embodiment of the invention.
Figure 12:
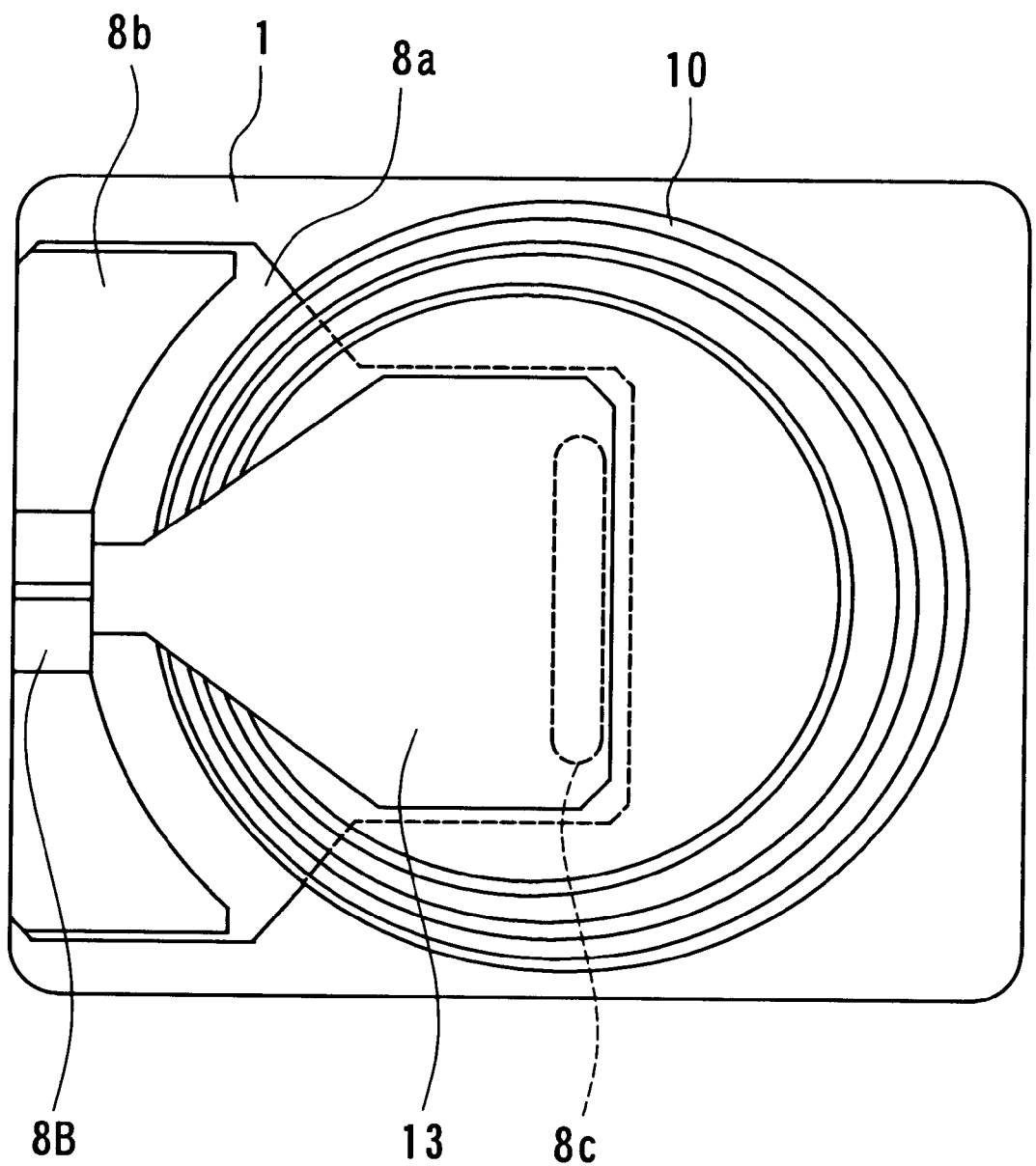
FIG. 12 is a top view of the thin-film magnetic head of the second embodiment.

Reference is now made to FIG. 11A, FIG. 11B and FIG. 12 to describe a thin-film magnetic head and a method of manufacturing the same of a second embodiment of the invention. FIG. 11A is a cross section orthogonal to an air bearing surface. FIG. 11B is a cross section parallel to the air bearing surface of a pole portion. FIG. 12 is a top view of the thin-film magnetic head in which an overcoat layer is omitted.

In the thin-film magnetic head of the second embodiment only the first layer 10 of the thin-film coil is provided. In this head a top pole layer 13 made up of a single layer is formed on the recording gap layer 12. The top pole layer 13 is connected to the auxiliary layer 8d on top of the third portion 3c of the bottom pole layer through a contact hole formed in a portion on top of the third portion 3c. In this embodiment an electrode layer 21 is connected to the portion 10a of the first layer 10 of the coil. The electrode layer 21 connects the portion 10a to an electrode pad.

The steps of the method of manufacturing the thin-film magnetic head of the second embodiment that are taken until the recording gap layer 12 is formed are similar to those of the first embodiment. In the following step of the second embodiment the top pole layer 13 and the electrode layer 21 each having a thickness of about 2 to 4 µm are formed on the recording gap layer 12. As shown in FIG. 12, the shape of the top pole layer 13 seen from above is similar to the shape of the pole portion layer 13a and the yoke portion layer 13c of the top pole layer of the first embodiment seen from above.

The top pole layer 13 may be made of NiFe (80 weight % Ni and 20 weight % Fe), or NiFe (45 weight % Ni and 55 weight % Fe) as a high saturation flux density material through plating or may be made of a material such as FeN or FeZrN as a high saturation flux density material through sputtering. Alternatively, a material such as CoFe or a Co-base amorphous material as a high saturation flux density material may be used.

Next, the recording gap layer 12 is selectively etched through dry etching, using the top pole layer 13 as a mask. Next, the second portion 8b of the bottom pole layer is selectively etched by about 0.3 to 0.6 µm through argon ion milling, for example. A trim structure as shown in FIG. 11B is thus formed.

Next, the overcoat layer 17 of alumina, for example, having a thickness of 20 to 40 µm is formed over the entire surface. The surface of the overcoat layer 17 is then flattened and pads (not shown) for electrodes are formed on the overcoat layer 17. Finally, lapping of the slider is performed to form the air bearing surfaces of the recording head and the reproducing head. The thin-film magnetic head of the embodiment is thus completed.

The remainder of the configuration, operations and effects of the embodiment are similar to those of the first embodiment.

[Third Embodiment]

Figure 13:
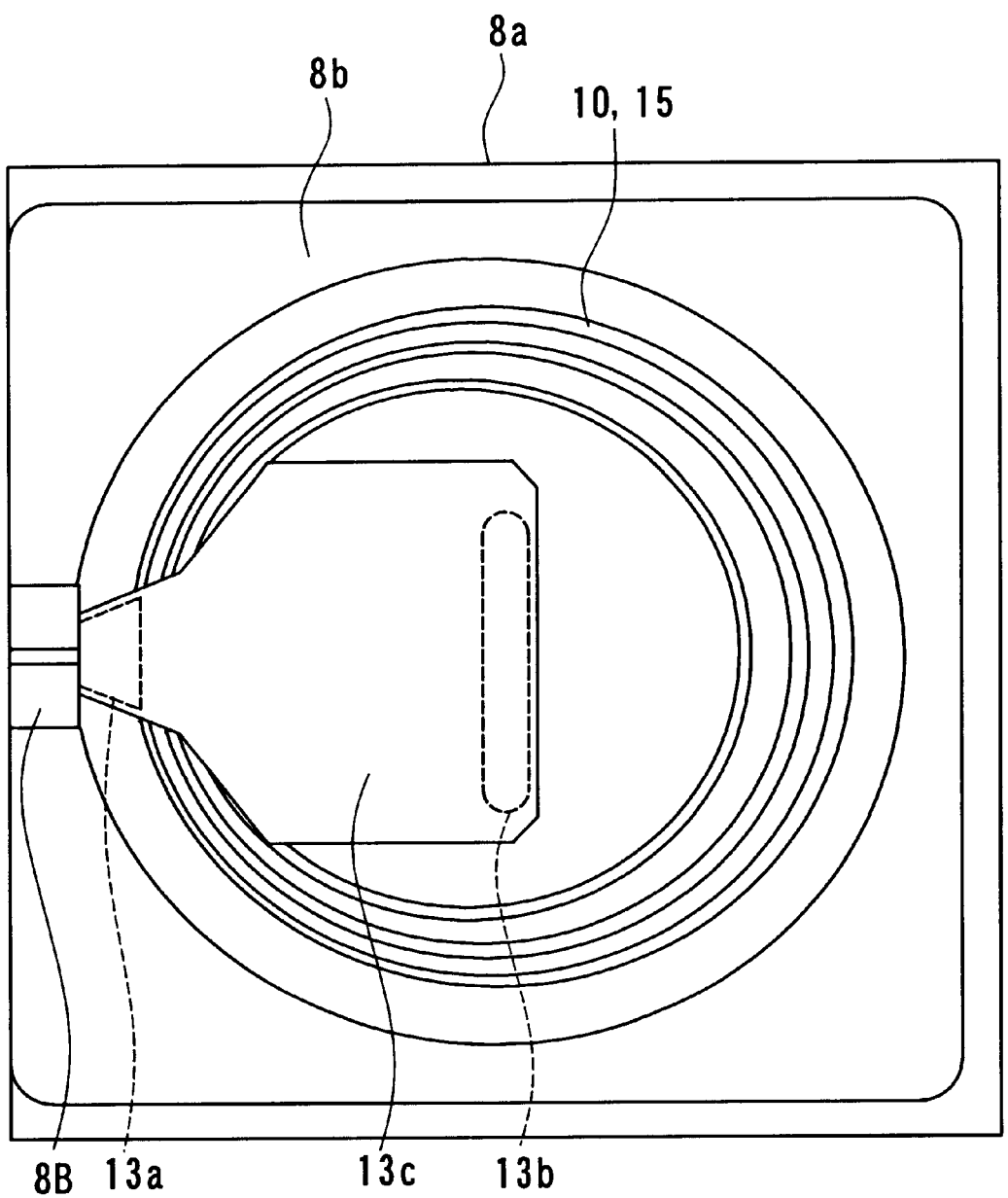
FIG. 13 is a top view of a thin-film magnetic head of a third embodiment of the invention.
Figures 18A, 18B:
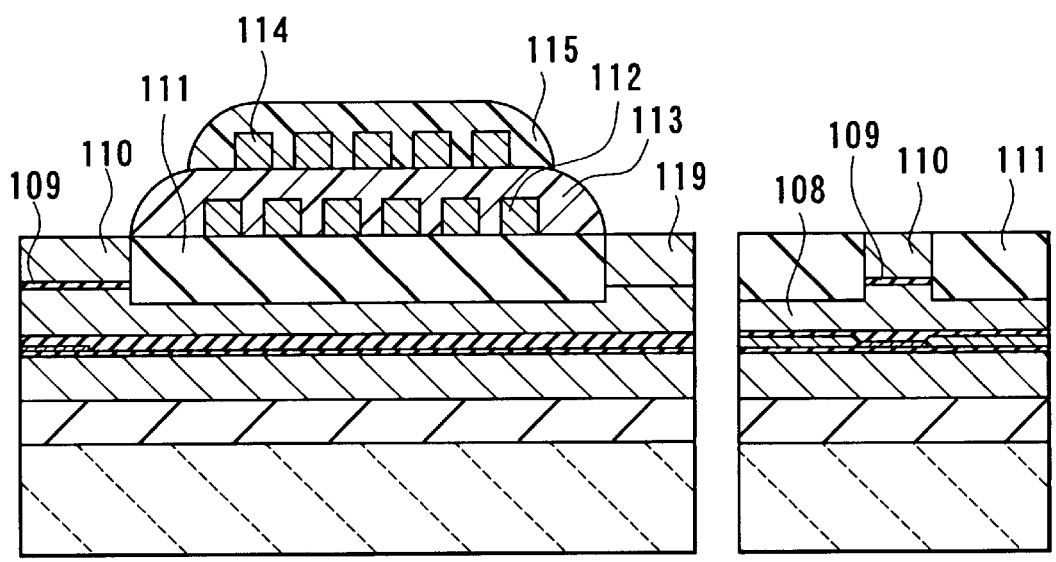
FIG. 18A and FIG. 18B are cross sections for illustrating a step that follows FIG. 17A and FIG. 17B.
Figures 19A, 19B:
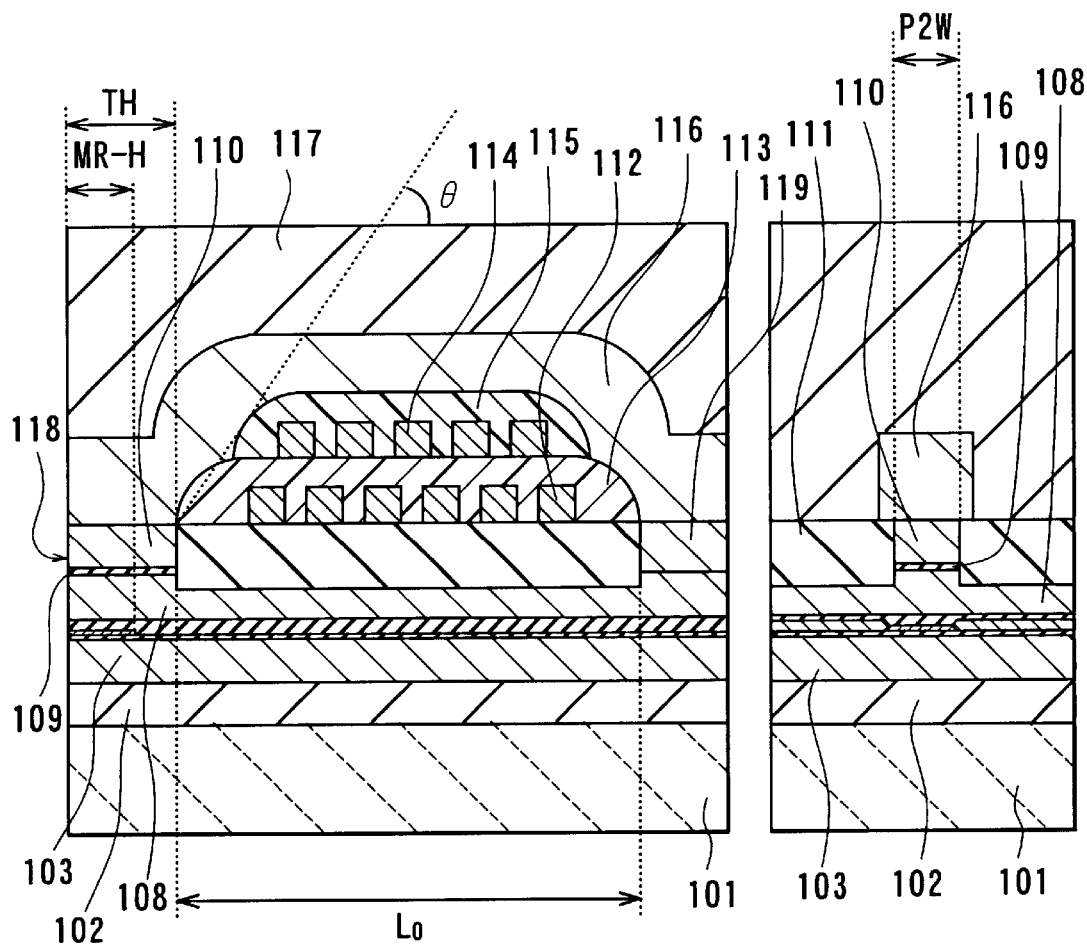
FIG. 19A and FIG. 19B are cross sections for illustrating a step that follows FIG. 18A and FIG. 18B.
Figure 20:
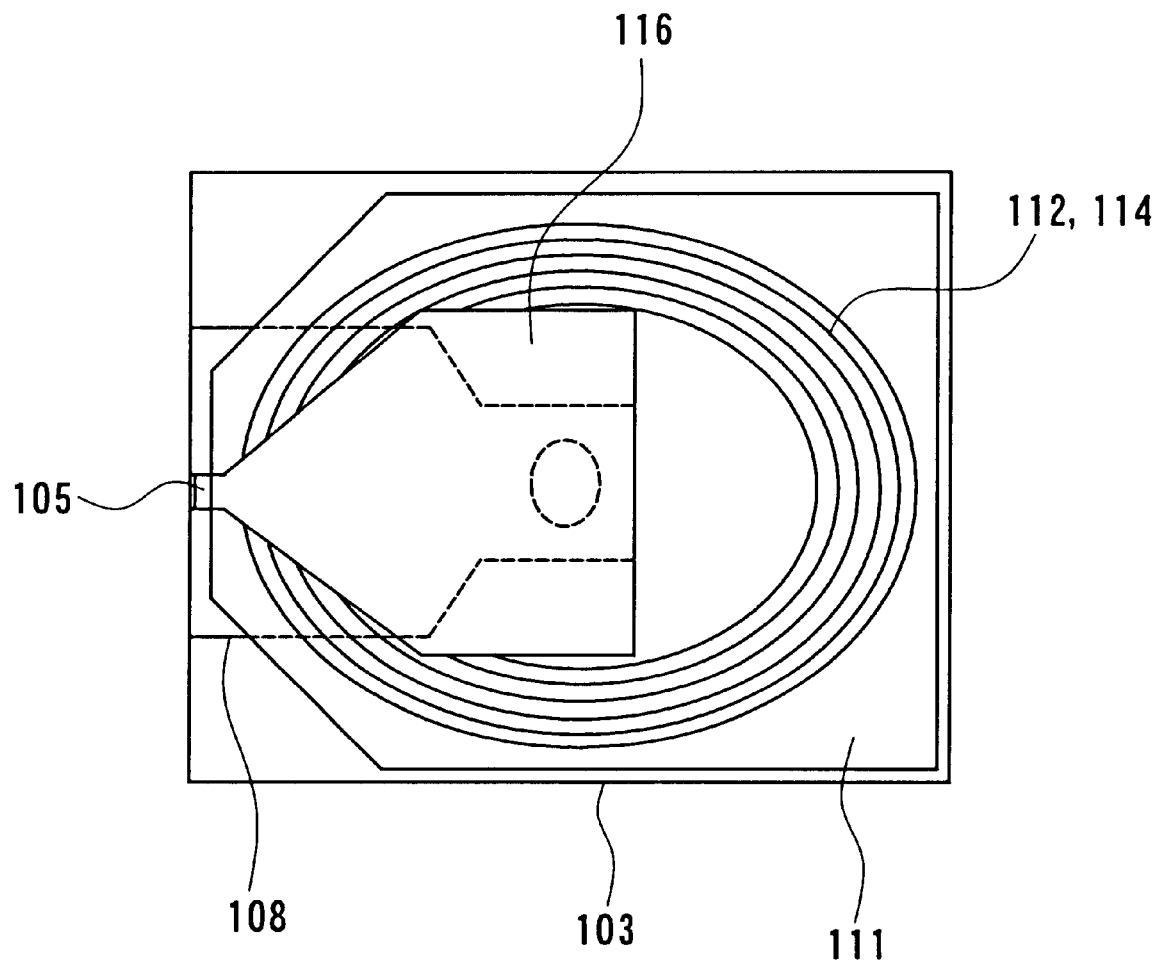
FIG. 20 is a top view of the related-art thin-film magnetic head.

Reference is now made to FIG. 13 to describe a thin-film magnetic head and a method of manufacturing the same of a third embodiment of the invention. FIG. 13 is a top view of the thin-film magnetic head in which an overcoat layer is omitted.

In the thin-film magnetic head of the third embodiment the second portion 3b of the bottom pole layer surrounds the first layer 10 of the thin-film coil. Such a shape of the second portion 3b facilitates the processing of flattening the insulating layer 11.

The shapes of the pole portion layer 13a and the yoke portion layer 13c of the top pole layer of the third embodiment are different from those of the first embodiment. That is, a portion of the pole portion layer 13a further from the air bearing surface than the zero throat height position or a neighborhood thereof increases in width with increases in distance from the air bearing surface. A portion of the yoke portion layer 13c overlaid on the pole portion layer 13a has a shape corresponding to the pole portion layer 13a.

The remainder of the configuration, operations and effects of the third embodiment are similar to those of the first embodiment. The second portion 8b of the second embodiment may alternatively have a shape similar to that of the third embodiment.

The present invention is not limited to the foregoing embodiments but may be practiced in still other ways. For example, although the bottom pole layer defines the throat height in the foregoing embodiments, the top pole layer may define the throat height.

In the foregoing embodiments the thin-film magnetic head is disclosed, comprising the MR element for reading formed on the base body and the induction-type magnetic transducer for writing stacked on the MR element. Alternatively, the MR element may be stacked on the magnetic transducer.

That is, the induction-type magnetic transducer for writing may be formed on the base body and the MR element for reading may be stacked on the transducer. Such a structure may be achieved by forming a magnetic film functioning as the top pole layer of the foregoing embodiments as a bottom pole layer on the base body, and forming a magnetic film functioning as the bottom pole layer of the embodiments as a top pole layer facing the bottom pole layer with a recording gap film in between. In this case it is preferred that the top pole layer of the induction-type magnetic transducer functions as the bottom shield layer of the MR element, too.

According to the thin-film magnetic head or the method of manufacturing the same of the invention described so far, the first magnetic layer is provided. The first magnetic layer includes: the first portion located in a region including a region that faces the thin-film coil; and the second portion forming the pole portion and connected to a surface of the first portion facing the coil. At least part of the coil is placed on a side of the second portion of the first magnetic layer. As a result, the second magnetic layer of the recording head is formed on the flat surface. The track width of the recording head is thereby reduced.

According to the thin-film magnetic head or the method of manufacturing the same of the invention, the auxiliary layer made of a high saturation flux density material is provided at least between the first portion of the first magnetic layer and at least part of the coil. The auxiliary layer forms part of the magnetic path. As a result, the total thickness of the first portion and the auxiliary layer is reduced and it is thereby possible to increase the thickness of the coil. It is therefore possible to reduce the line width of the coil. As a result, a reduction in yoke length of the recording head is achieved.

In the thin-film magnetic head or the method of manufacturing the same of the invention, the second portion of the first magnetic layer may define the throat height, and the second magnetic layer defines the recording track width. As a result, the throat height is uniformly defined with precision even if the track width is reduced.

In the thin-film magnetic head or the method of manufacturing the same of the invention, the second magnetic layer may include the pole portion layer forming the pole portion, and the yoke portion layer forming the yoke portion. An end face of the yoke portion layer that faces toward a recording medium is located at a distance from surface of the thin-film magnetic head that faces toward the recording medium. In this case, it is possible to prevent writing of data in a region where data is not supposed to be written.

According to the thin-film magnetic head or the method of manufacturing the same of the invention, the property of the recording head is further improved if the second portion of the first magnetic layer is made of a high saturation flux density material.

According to the thin-film magnetic head or the method of manufacturing the same of the invention, the insulating layer may be provided to cover at least part of the thin-film coil placed on a side of the second portion of the first magnetic layer. A surface of the insulating layer facing the recording gap layer is flattened. In this case, it is easy to form the recording gap layer, the second magnetic layer and so on.

According to the thin-film magnetic head or the method of manufacturing the same of the invention, the second portion of the first magnetic layer may surround at least part of the thin-film coil. In this case, it is easy to flatten the insulating layer covering the at least part of the coil.

Obviously many modifications and variations of the present invention are possible in the light of the above teachings. It is therefore to be understood that within the scope of the appended claims the invention may be practiced otherwise than as specifically described.

What is claimed is:

1. A thin-film magnetic head comprising:

a reproducing head including: a magnetoresistive element; and a first shield layer and a second shield layer for shielding the magnetoresistive element, portions of the first and second shield layers located in regions on a side of a medium facing surface of the head that faces toward a recording medium being opposed to each other, the magnetoresistive element being placed between the portions of the shield layers; and a recording head including: a first magnetic layer and a second magnetic layer magnetically coupled to each other and including magnetic pole portions opposed to each other and placed in regions of the magnetic layers on a side of the medium facing surface, each of the magnetic layers including at least one layer; a gap layer provided between the pole portions of the first and second magnetic layers; and a thin-film coil at least part of which is placed between the first and second magnetic layers, the at least part of the coil being insulated from the first and second magnetic layers; wherein:

the first magnetic layer is located next to the reproducing head and includes: a first layer located in a region including a region that faces the coil; a second layer forming one of the pole portions and connected to a surface of the first layer facing the coil; and an auxiliary layer made of a high saturation flux density material and located at least between the first layer and the at least part of the coil, the auxiliary layer forming part of a magnetic path;

the surface of the first layer facing the coil and a surface of the second layer facing the gap layer form a step due to a difference in level between the surfaces;

the auxiliary layer touches the first layer; and the at least part of the coil is located on a side of the second layer of the first magnetic layer.

2. The thin-film magnetic head according to claim 1, wherein the second layer of the first magnetic layer defines a throat height, and the second magnetic layer defines a recording track width.

3. The thin-film magnetic head according to claim 1, wherein the second magnetic layer includes: a magnetic pole portion layer forming lone of the pole portions; and a yoke portion layer connected to the pole portion layer and forming a yoke portion.

4. The thin-film magnetic head according to claim 3, wherein the thin-film coil includes a first layer portion located on a side of the second layer of the first magnetic layer and a second layer portion located on a side of the pole portion layer of the second magnetic layer.

5. The thin-film magnetic head according to claim 4, wherein the pole portion layer of the second magnetic layer is equal to or greater than the second layer of the first magnetic layer in length.

6. The thin-film magnetic head according to claim 4, wherein an end face of the yoke portion layer that faces toward the recording medium is located at a distance from the medium facing surface of the head.

7. The thin-film magnetic head according to claim 1, wherein the auxiliary layer covers the first and second layers of the first magnetic layer.

8. The thin-film magnetic head according to claim 1, wherein the second layer of the first magnetic layer is made of a high saturation flux density material the same as or different from the high saturation flux density material of which the auxiliary layer is made.

9. The thin-film magnetic head according to claim 1, further comprising an insulating layer that covers at least part of the coil located on the side of the second layer of the first magnetic layer, a surface of the insulating layer that faces the recording gap layer being flattened.

10. The thin-film magnetic head according to claim 9, wherein the second layer of the first magnetic layer surrounds at least part of the coil.

11. The thin-film magnetic head according to claim 1, wherein the first magnetic layer functions as the second shield layer, too.

12. A method of manufacturing a thin-film magnetic head comprising:

a reproducing head including: a magnetoresistive element; and a first shield layer and a second shield layer for shielding the magnetoresistive element, portions of the first and second shield layers located in regions on a side of a medium facing surface of the head that faces toward a recording medium being opposed to each other, the magnetoresistive element being placed between the portions of the shield layers; and a recording head including: a first magnetic layer and a second magnetic layer magnetically coupled to each other and including magnetic pole portions opposed to each other and placed in regions of the magnetic layers on a side of the medium facing surface, each of the magnetic layers including at least one layer; a gap layer provided between the pole portions of the first and second magnetic layers; and a thin-film coil at least part of which is placed between the first and second magnetic layers, the at least part of the coil being insulated from the first and second magnetic layers; wherein:

the first magnetic layer is located next to the reproducing head; the method including the steps of:
  forming the reproducing head;
  forming the first magnetic layer;
  forming the gap layer on the first magnetic layer;
  forming the second magnetic layer on the gap layer; and
  forming the coil such that the at least part of the coil is insulated from the first and second magnetic layers; wherein:
    the step of forming the first magnetic layer includes formation of: a first layer located in a region including a region that faces the coil; a second layer forming one of the pole portions and connected to a surface of the first layer facing the coil; and an auxiliary layer made of a high saturation flux density material and located at least between the first layer and the at least part of the coil, the auxiliary layer forming part of a magnetic path;
    the surface of the first layer facing the coil and a surface of the second layer facing the gap layer form a step due to a difference in level between the surfaces;
    the auxiliary layer touches the first layer; and
    in the step of forming the coil, the at least part of the coil is formed on the auxiliary layer such that the at least part of the coil is placed on a side of the second layer of the first magnetic layer.

13. The method according to claim 12, wherein the first magnetic layer is formed such that the second layer defines a throat height in the step of forming the first magnetic layer, and the second magnetic layer is formed such that the second magnetic layer defines a recording track width in the step of forming the second magnetic layer.

14. The method according to claim 12, wherein the step of forming the second magnetic layer includes formation of: a magnetic pole portion layer forming one of the pole portions; and a yoke portion layer connected to the pole portion layer and forming a yoke portion.

15. The method according to claim 14, wherein the step of forming the coil includes formation of: a first layer portion located on a side of the second layer of the first magnetic layer; and a second layer portion located on a side of the pole portion layer of the second magnetic layer.

16. The method according to claim 15, wherein the pole portion layer of the second magnetic layer is equal to or greater than the second layer of the first magnetic layer in length.

17. The method according to claim 15, wherein an end face of the yoke portion layer that faces toward the recording medium is located at a distance from the medium facing surface of the head.

18. The method according to claim 12, wherein the auxiliary layer is formed to cover the first and second layers of the first magnetic layer in the step of forming the first magnetic layer.

19. The method according to claim 12, wherein the second layer of the first magnetic layer is made of a high saturation flux density material in the step of forming the first magnetic layer.

20. The method according to claim 12, further including the step of forming an insulating layer that covers at least part of the coil located on the side of the second layer of the first magnetic layer, a surface of the insulating layer that faces the recording gap layer being flattened.

21. The method according to claim 20, wherein the second layer of the first magnetic layer is formed to surround at least part of the coil in the step of forming the first magnetic layer.

22. The method according to claim 12, wherein the first magnetic layer is formed to function as the second shield layer, too.

* * * * *

UNITED STATES PATENT AND TRADEMARK OFFICE
CERTIFICATE OF CORRECTION

PATENT NO.    : 6,477,005 B1
DATED         : November 5, 2002
INVENTOR(S)   : Yoshitaka Sasaki It is certified that error appears in the above-identified patent and that said Letters Patent is hereby corrected as shown below:

<u>Column 9,</u>
Line 17, please replace "bottom shield layer 31" with -- bottom shield layer 3 --.

Signed and Sealed this

Eighth Day of April, 2003

JAMES E. ROGAN
*Director of the United States Patent and Trademark Office*